(12) United States Patent
Kim

(10) Patent No.: US 7,939,191 B2
(45) Date of Patent: May 10, 2011

(54) RECHARGEABLE BATTERY AND COUPLING STRUCTURE THEREOF

(75) Inventor: Jun Ho Kim, Yongin-si (KR)

(73) Assignee: Samsung SDI Co., Ltd., Suwon (KR)

( * ) Notice: Subject to any disclaimer, the term of this patent is extended or adjusted under 35 U.S.C. 154(b) by 1162 days.

(21) Appl. No.: 11/380,949

(22) Filed: May 1, 2006

(65) Prior Publication Data

US 2006/0251931 A1  Nov. 9, 2006

(30) Foreign Application Priority Data

May 4, 2005  (KR) .................. 10-2005-0037610

(51) Int. Cl.
*H01M 2/34* (2006.01)
*H01M 2/08* (2006.01)
*H01M 2/02* (2006.01)

(52) U.S. Cl. ............... 429/61; 429/7; 429/174; 429/178

(58) Field of Classification Search .................. None
See application file for complete search history.

(56) References Cited

U.S. PATENT DOCUMENTS

| 5,817,423 | A * | 10/1998 | Kajimaru et al. | 428/461 |
| 6,319,631 | B1 * | 11/2001 | Bay et al. | 429/178 |
| 6,524,739 | B1 * | 2/2003 | Iwaizono et al. | 429/61 |
| 6,803,144 | B2 * | 10/2004 | Hovi et al. | 429/123 |
| 2002/0106834 | A1 * | 8/2002 | Chiu et al. | 438/113 |
| 2004/0170887 | A1 * | 9/2004 | Masumoto et al. | 429/61 |
| 2004/0228061 | A1 * | 11/2004 | Kim et al. | 361/103 |

FOREIGN PATENT DOCUMENTS

| JP | 07-057721 | 3/1995 |
| JP | 2001-102039 | 4/2001 |
| JP | 2001-283933 | 10/2001 |
| JP | 2002-298809 | 10/2002 |
| JP | 2002-298829 | 10/2002 |
| JP | 2003-077436 | 3/2003 |
| JP | 2003-203621 | 7/2003 |
| JP | 2004-179073 | 6/2004 |
| JP | 2004-227959 | 8/2004 |

* cited by examiner

*Primary Examiner* — Dah-Wei D Yuan
*Assistant Examiner* — Adam A Arciero
(74) *Attorney, Agent, or Firm* — H.C. Park & Associates, PLC

(57) ABSTRACT

A rechargeable battery includes a protective circuit board that includes a horizontal electrical terminal arranged parallel to a cap plate. The connection structure of the protective circuit board reduces the size of the rechargeable battery.

11 Claims, 5 Drawing Sheets

RECHARGEABLE BATTERY AND COUPLING STRUCTURE THEREOF

CROSS REFERENCE TO RELATED APPLICATION

This application claims priority to and the benefit of Korean Patent Application No. 10-2005-0037610, filed on May 4, 2005, which is hereby incorporated by reference for all purposes as if fully set forth herein.

BACKGROUND OF THE INVENTION

1. Field of the Invention

The present invention relates to a rechargeable battery, and more particularly to a rechargeable battery including a bare cell having an electrode assembly, a can, and a cap assembly and a protective circuit board electrically coupled to the bare cell.

2. Description of the Prior Art

Rechargeable batteries may be compact in size and still have a large capacity. Typical examples of rechargeable batteries include nickel-metal hydride (Ni—MH) batteries and lithium ion batteries, such as lithium ion polymer batteries.

FIG. 1 is an exploded perspective view showing a conventional can-type lithium ion battery. FIG. 2 is a partial perspective view showing a breaker, a lead plate, and the like, which are installed on a cap plate of a bare cell of the battery shown in FIG. 1 before a protective circuit board is coupled to the bare cell.

Referring to FIG. 1 and FIG. 2, the lithium ion battery may include a bare cell having an electrode assembly 212, an electrolyte, a can 10, and a cap assembly and a protective circuit board 300 coupled to the bare cell to adjust voltage or current during charging and discharging.

The electrode assembly 212 may be formed by laminating a thin plate or film type positive electrode 213, a separator 214, and an negative electrode 215 and rolling up the laminate.

The can 10 may be made of aluminum or aluminum alloy in an approximately rectangular shape. The electrode assembly 212 may be placed into the can 10 via its open top. As such, the can 10 may act as a container of the electrode assembly 212 and an electrolyte.

The cap assembly may be provided with a flat cap plate 110. The cap plate 110 may have a terminal through-hole 111 formed thereon so that an electrode terminal can extend through. The electrode terminal, which may extend through the cap plate 110, may have a tubular gasket 120 arranged on an outer portion to electrically insulate the electrode terminal 130 and the cap plate 110. An insulation plate 140 may be positioned at the center of the lower surface of the cap plate 110 near the terminal through-hole 111. A terminal plate 150 may be positioned on the lower surface of the insulation plate 140.

A positive electrode tab 216 may be drawn from a positive electrode 213 and welded to the lower surface of the cap plate 110. A negative electrode tab 217 may be drawn from a negative electrode 215 and welded to the lower end of the electrode terminal 130.

The electrode assembly 212 may have an insulation case 190 arranged on the upper surface thereof to electrically insulate the electrode assembly 212 from the cap assembly and cover the top of the electrode assembly 212. The insulation case 190 may be made of a high-molecular resin having insulation properties, such as polypropylene. The electrode assembly 212 may have a lead through-hole 191 formed at its center through which the negative electrode tab 217 may extend and an electrolyte through-hole 192 formed on its side. The electrolyte through-hole may be omitted. A through-hole for the positive electrode tab 216 may be arranged next to the lead through-hole 191 for the negative electrode 217.

The cap plate 110 may have an electrolyte injection hole 112 formed on a side thereof. After an electrolyte is injected, a plug 160 may seal the electrolyte injection hole 112.

The periphery of the cap plate 110 may be welded to the lateral wall of the can 10 to couple the cap assembly to the can 10. After the cap assembly is coupled to the can 10, the upper end of the lateral wall of the can 10 may be bent inwards as a flange on the cap plate 110.

The cap plate may have a protrusion formed on a side thereof. A holder 320 may be coupled to the protrusion 310. The holder 320 may have a groove formed at its center so that the protrusion 310 may be inserted and fitted without clearance. Once the holder 320 is fitted to the protrusion 310, the holder 320 will move very little even when subjected to a lateral force. The holder 320 may simply cover the protrusion 310 or may be welded to the holder 320 to improve the strength.

When the holder 320 is welded to the protrusion 310, the holder 320 may be made of the same or similar material as the protrusion 310. The holder 320 increases the height of a structure vertically extending from a horizontal surface of the cap plate 110 even if the protrusion 310 is short. Therefore, a shaped resin portion may be prevented from slipping on the low-profile protrusion and separating from a unit cell, even when a pack battery is subjected to an external twisting force.

The electrode terminal 130 may be arranged at the center of the cap assembly and may protrude from the cap plate 110. The electrode terminal 130 may have a separate tab with conductive properties (not shown) attached to it in a similar manner as that between the protrusion 310 and the holder 320. Although the tab is positioned at the center of the cap plate 110 and has weak resistance to an external twisting force, it can sufficiently act as a support against an external bending force.

The cap assembly may include a cap plate 110 for sealing an opening through which the electrode assembly 212 is placed into the can 10, an electrode terminal 130 insulated from the cap plate by a gasket 120, and a lead plate 410 for electrically coupling the bare cell to the protective circuit board 300. A breaker 420 may be coupled to the cap plate as a battery safety device.

An electrode 217 of the electrode assembly may be welded to a terminal plate 150 inside the bare cell. The terminal plate 150 may be spaced apart from the lower surface of the cap plate 110 by the insulation plate 140 and may be electrically coupled to the electrode terminal 130, which is insulated from the cap plate 110 by the gasket 120. Another electrode 216 of the electrode assembly may be directly welded to a surface of the cap plate 110.

The breaker 420 may be attached to the top of the cap plate 110 and insulated from the cap plate 110 by an insulation material 330, such as double-faced tape. The electrode terminal 130 may be coupled to an electrical terminal 421 formed on a side of the breaker 420. An electrical terminal 423 arranged on the other side of the breaker 420 may be coupled to an electrical terminal 370 of the protective circuit 300. Hereinafter, the electrical terminal 130 of the bare cell will be referred to as an "electrode terminal" and the electrical terminal 421, 423 of the current interruption device will be referred to as an "electrode" so that it may be distinguished from the electrical terminal of the protective circuit board. The lead plate 410 may be welded to a side of the cap plate 110, which is opposite to the breaker 420 about the electrode terminal 130. The lead plate 410 may be coupled to another electrical terminal 360 of the protective circuit board 300. The breaker 420 may be coupled in series between the protective circuit board 300 and the electrode terminal of the bare cell 130 so that charging and discharging current can flow through it. The reference numbers 311 and 321 are external terminals to connect the battery to a charger or electronic devices. A problem with the charging or discharging current may generate heat and increase the temperature. Upon sensing this heat, the breaker 420 may interrupt the circuit.

The breaker 420 is commonly made of a bi-metal switch, which is opened to interrupt the current or closed to allow the current to flow as the temperature rises or falls, respectively. However, this feature may be dangerous because, although the current may be temporarily interrupted when the rechargeable battery malfunctions, the danger may persist and eventually the rechargeable battery may catch fire or explode. Therefore, an irreversible safety device, such as a PTC (positive temperature coefficient) device, may be used instead of the breaker 420.

When a breaker 420 is used as shown in FIG. 1 and FIG. 2, additional cost and space are necessary to provide the breaker 420 with electrodes 421 and 423 to couple the breaker 420 to the electrode terminal 130 and to the electrical terminal 370 of the protective circuit board 300, respectively. For the sake of electrical coupling to the protective circuit board 300, the lead plate 410, the electrical terminals of the breaker 421 and 423, and the electrical terminals 360 and 370 of the protective circuit board 300, all of which are connected to the bare cell, may have an approximately L-shaped configuration. Horizontal portions of the L-shaped terminals may be fixed to the bare cell or to the protective circuit board 300, and the vertical portions thereof may be welded while corresponding parts are overlapped. As a result, the vertical portions may increase the overall length of the rechargeable battery. This is counterproductive to the goal of producing compact rechargeable batteries having a large capacity.

In addition, a separate insulation material, such as double-faced tape, must be prepared and attached to the cap plate to insulate the entire breaker from the cap plate. This requires additional materials and increases manufacturing costs.

SUMMARY OF THE INVENTION

This invention provides a rechargeable battery that includes safety devices with a simplified coupling structure to reduce the cost of parts and manufacturing.

The present invention also provides a rechargeable battery that includes a protective circuit board and a bare cell with a coupling structure arranged in such as way as to reduce the size of the rechargeable battery while securing a large capacity.

Additional features of the invention will be set forth in the description which follows, and in part will be apparent from the description, or may be learned by practice of the invention.

The present invention discloses a rechargeable battery, including a bare cell including, an electrode assembly including two electrodes and a separator, a can to contain the electrode assembly and an electrolyte, and a cap assembly including a cap plate to seal an open portion of the can, and a protective circuit board including an electrical terminal arranged horizontally and parallel to the cap plate on a surface of the protective circuit board.

The present invention also discloses a rechargeable battery, including a bare cell including an electrode assembly including two electrodes and a separator, a can to contain the electrode assembly and an electrolyte, and a cap assembly including a cap plate to seal an open portion of the can; a protective circuit board including an electrical terminal arranged horizontally and parallel to the cap plate on a surface of the protective circuit board; and a current interruption device arranged between the cap plate and the protective circuit board, the current interruption device including an upper electrode arranged horizontally, a body to sense heat and interrupt current, and a lower electrode arranged horizontally, wherein the lower electrode of the current interruption device is connected to the cap plate, and wherein the upper electrode of the current interruption device and an electrode terminal of the cap assembly are electrically coupled with the electrical terminal of the protective circuit board.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
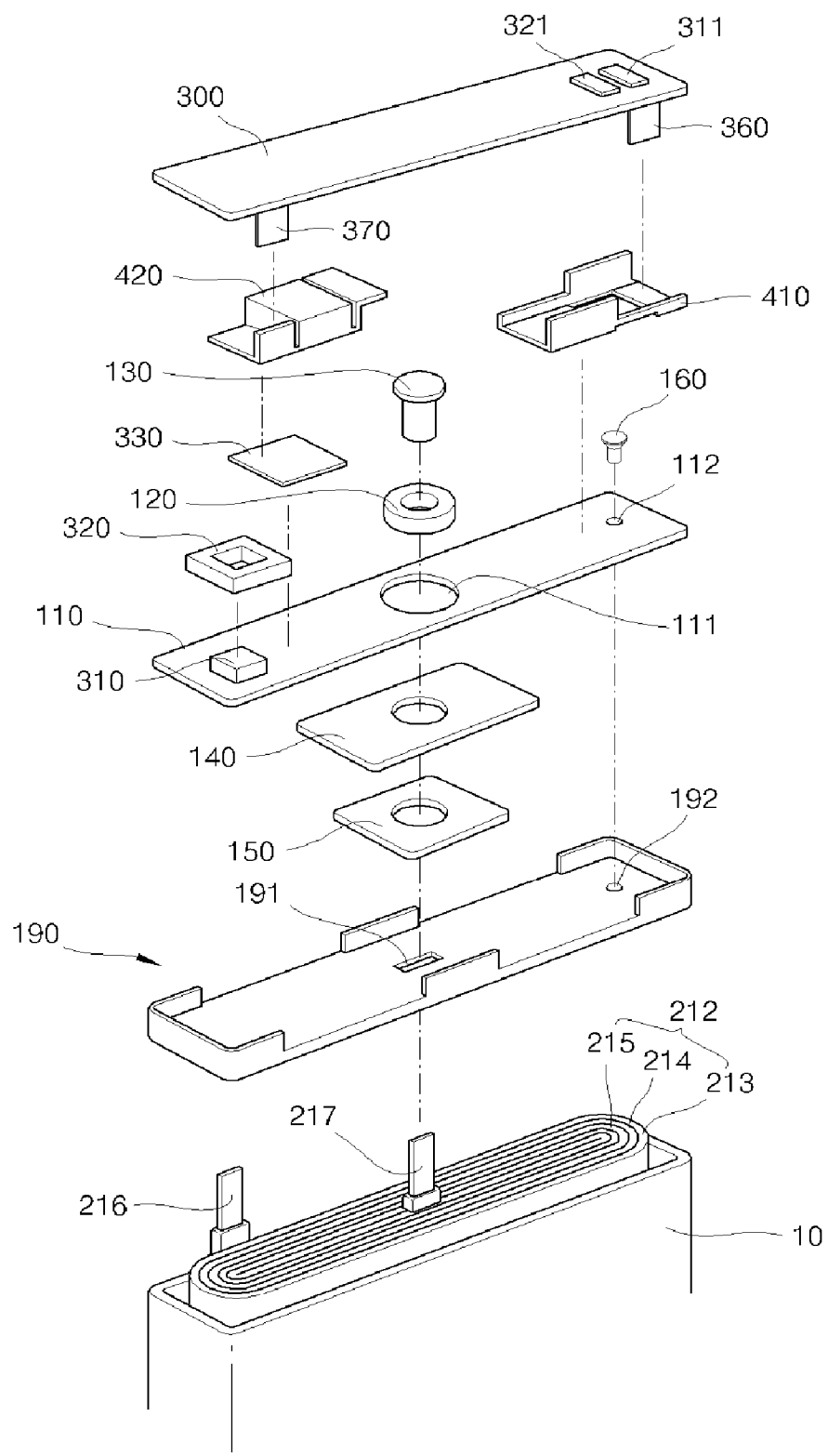
FIG. 1 is an exploded perspective view showing a conventional can-type lithium ion battery.
Figure 2:
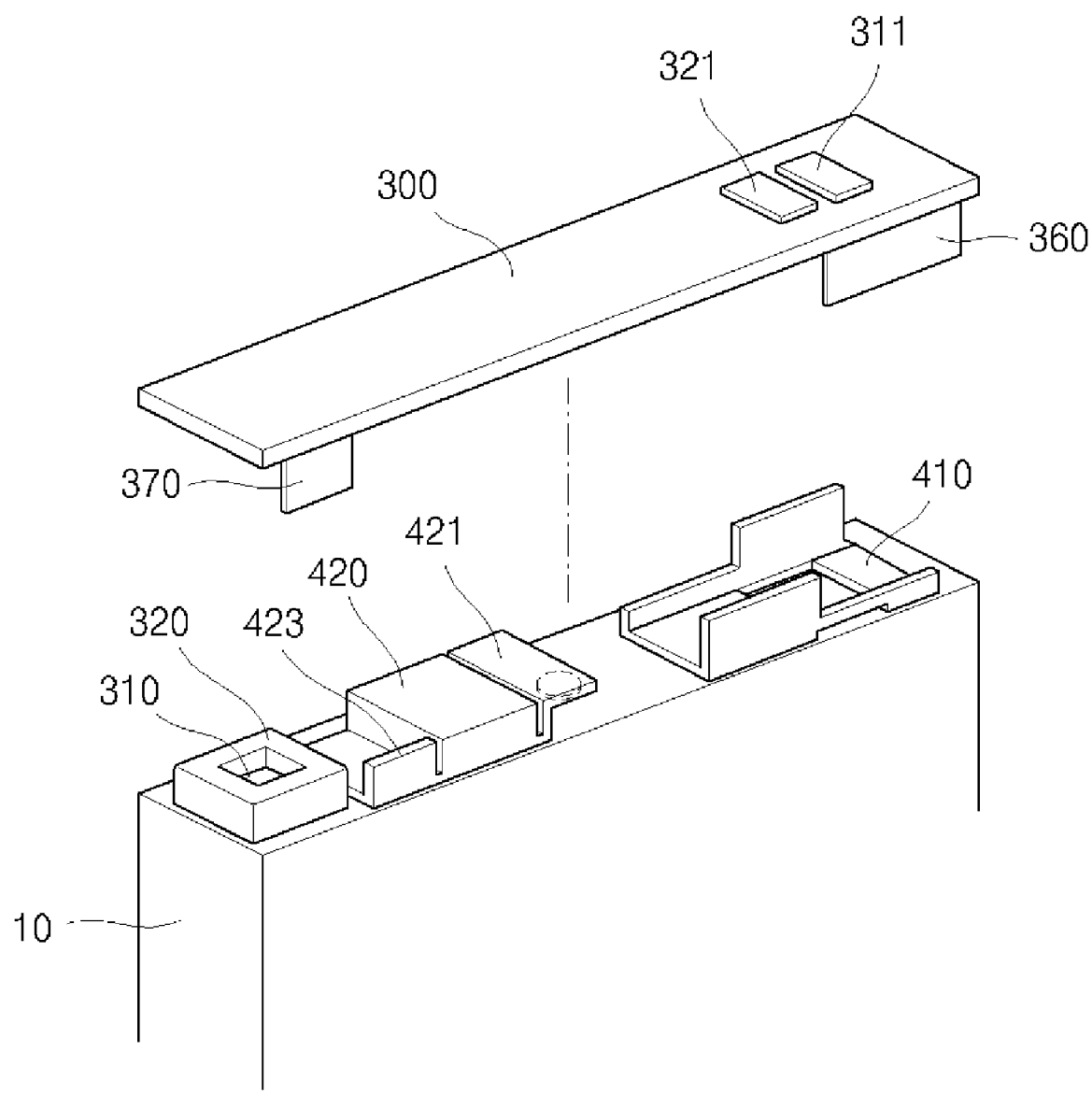
FIG. 2 is a partial perspective view showing a breaker, a lead plate, and the like installed on a cap plate of a bare cell before a protective circuit board is coupled to the bare cell.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element such as a layer, film, region or substrate is referred to as being "on" another element, it can be directly on the other element or intervening elements may also be present. In contrast, when an element is referred to as being "directly on" another element, there are no intervening elements present.

Figure 3:
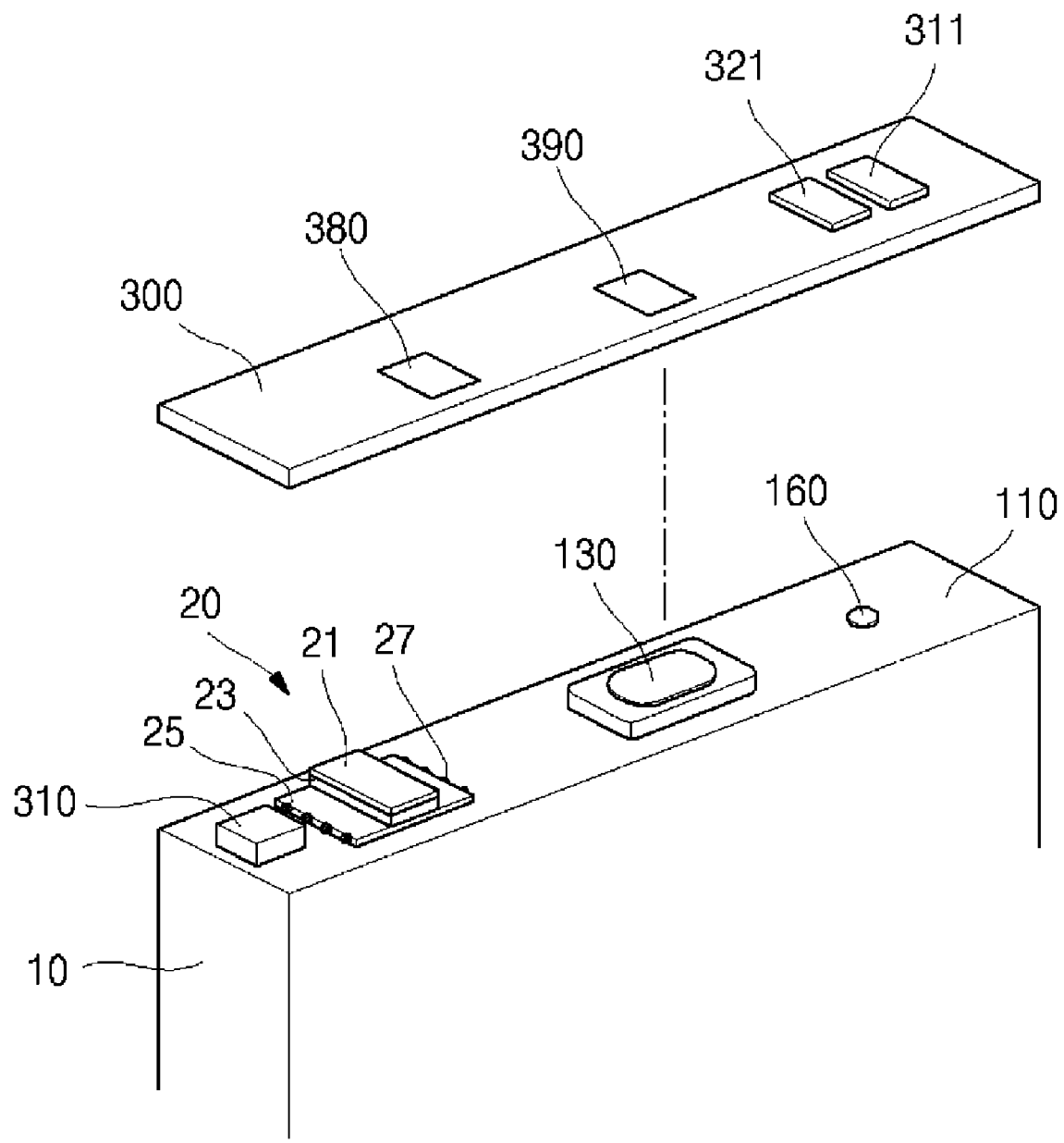
FIG. 3 is a partial perspective view showing a rechargeable battery according to an exemplary embodiment of the present invention that includes a PTC device positioned on a cap plate of a bare cell and a protective circuit board aligned above and coupled to the PTC device.

FIG. 3 is a partial perspective view showing a rechargeable battery according to an exemplary embodiment of the present invention, in which a PTC device is arranged on a cap plate of a bare cell, and a protective circuit board is aligned above and coupled to the PTC device.

Referring to FIG. 3, the PTC device 20 may include an upper electrode 21, a lower electrode 25, and a body 23. The body 23 may be arranged between the upper and lower electrodes 21 and 25 and may be made of a heat-sensitive material. The upper and lower electrodes 21 and 25 may be composed of metal plates and may be welded to an electrical terminal 380 of the protective circuit board 300 and to the cap plate 110, respectively.

The lower electrode 25 may be directly connected to a portion of the cap plate 110 to which a breaker would be attached according to the prior art, with no interposition of an insulation material. Conductive adhesive or welding may be used to couple the lower electrode 25 to the cap plate 110. If welding is used, a periphery of the lower electrode 25 may partially protrude from the lower electrode 25 or the body 23 in the lateral direction to form a terminal 27, as shown in the drawing. In this case, welding may begin from the terminal. Laser welding may be used if the cap plate 110 or the lower electrode 25 is made of metal having low resistance and high thermal conductivity, such as aluminum.

The upper electrode of the PTC device 20 may have the same polarity as the cap plate and may be coupled to the positive electrical terminal 380 of the protective circuit board 300 by welding. A thick plate of heat resistant metal, such as nickel or nickel alloy may be used to perform the welding and protect the body in the welding process.

An electrode terminal 130 may be arranged at the center of the cap assembly.

The protective circuit board 300 may have horizontal electrical terminals 380 and 390 partially made of a metal plate, instead of electrical terminals made of vertical metal plates. The horizontal electrical terminals 380 and 390 may be coupled to the plate-type upper electrode 21 of the PTC device and the upper end of the electrode terminal 130, respectively, by overlapping the components and laser welding performed by irradiating laser beams from above.

In this manner, the upper electrode 21 of the PTC device 20 and the upper end of the electrode terminal 130 may be directly connected to the electrical terminals 380 and 390 of the protective circuit board 300, respectively, without using vertical portions of L-shaped electrical terminals as are used in conventional rechargeable batteries. This reduces the length corresponding to the vertical portions for electrical connection.

Figure 4:
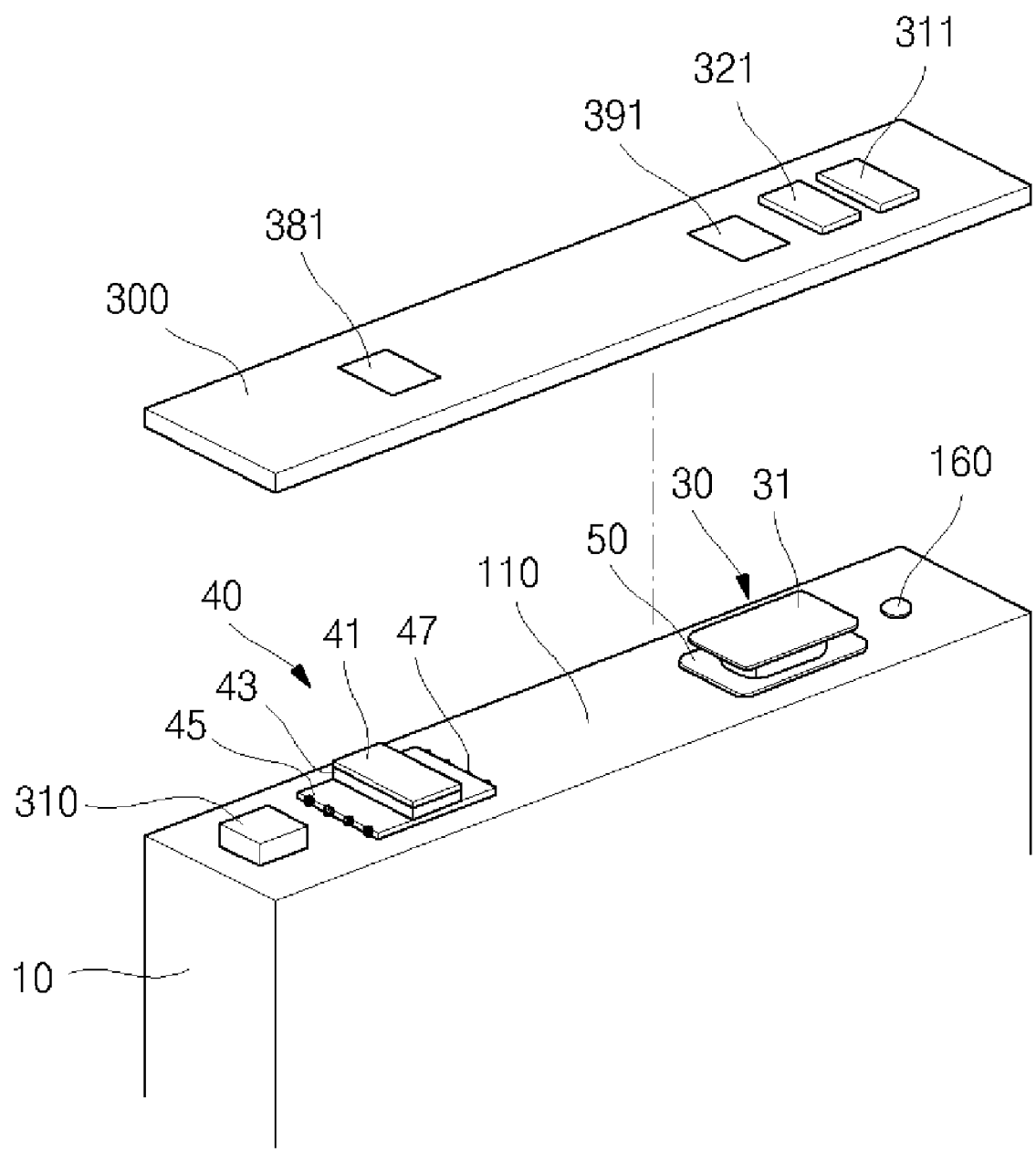
FIG. 4 is a partial perspective view showing a rechargeable battery according to an exemplary embodiment of the present invention.

FIG. 4 is a partial perspective view showing a rechargeable battery according to an exemplary embodiment of the present invention.

Referring to FIG. 4, the rechargeable battery may be provided with a breaker 40, which has a lower terminal 45, a bi-metal actuator 43, and an upper terminal 41, but has no lead plate-type terminal. The lower terminal 45 is directly connected to a cap plate 110, and no insulation material, such as double-faced tape, is used to insulate the breaker 40 from the cap plate 110. The reference numeral 47 is a wider part of the lower terminal 45.

In contrast to the exemplary embodiment shown in FIG. 3, the cap plate 110 may have an electrode terminal 30 arranged on a portion thereof and displaced from the longitudinal center in the opposite direction to the breaker 40. A protective circuit board 300 may have electrical terminals 381 and 391 with a horizontal configuration. The electrical terminals 381 and 391 may be welded to and make surface contact with the upper terminal 41 of the breaker 40 and to the upper surface 31 of the electrode terminal 30, respectively. The electrode terminal 30 may be insulated from the cap plate 110 by the gasket 50.

The breaker 40 may have a cap (not shown) formed on a side thereof to be attached to a protrusion 310 formed on the cap plate. The upper portion 31 of the electrode terminal 30 may be wider than other portions of the electrode terminal so that the upper portion 31 may be more easily welded to the protective circuit board 300. In addition, the wider portion may act as a latching step to facilitate attachment of a resin portion to a bare cell if a hot-melt resin is used to fill the space between the bare cell and the protective circuit board 300.

According to the above exemplary embodiments, heat is directly transferred from the bare cell to the PTC device or breaker without interposition of an insulation material, so that the safety device can be actuated more quickly when the rechargeable battery malfunctions and generates excessive heat. This improves the safety of the battery. To this end, the lower electrode of the PTC device or breaker may be made of a thin material with excellent thermal conductivity.

When the position of the electrode terminal is modified as shown in FIG. 4, the position of the terminal through-hole 111 of the cap plate, the electrolyte injection hole 112, and the portion of the electrode assembly through which the electrode tab is drawn may vary accordingly, together with the shape and arrangement of the terminal plate 150 or the insulation plate 140 beneath the cap plate 110.

The electrode assembly or bare cell in the exemplary embodiments shown in FIG. 3 and FIG. 4 may have an internal construction similar to that of conventional rechargeable batteries.

Figure 5:
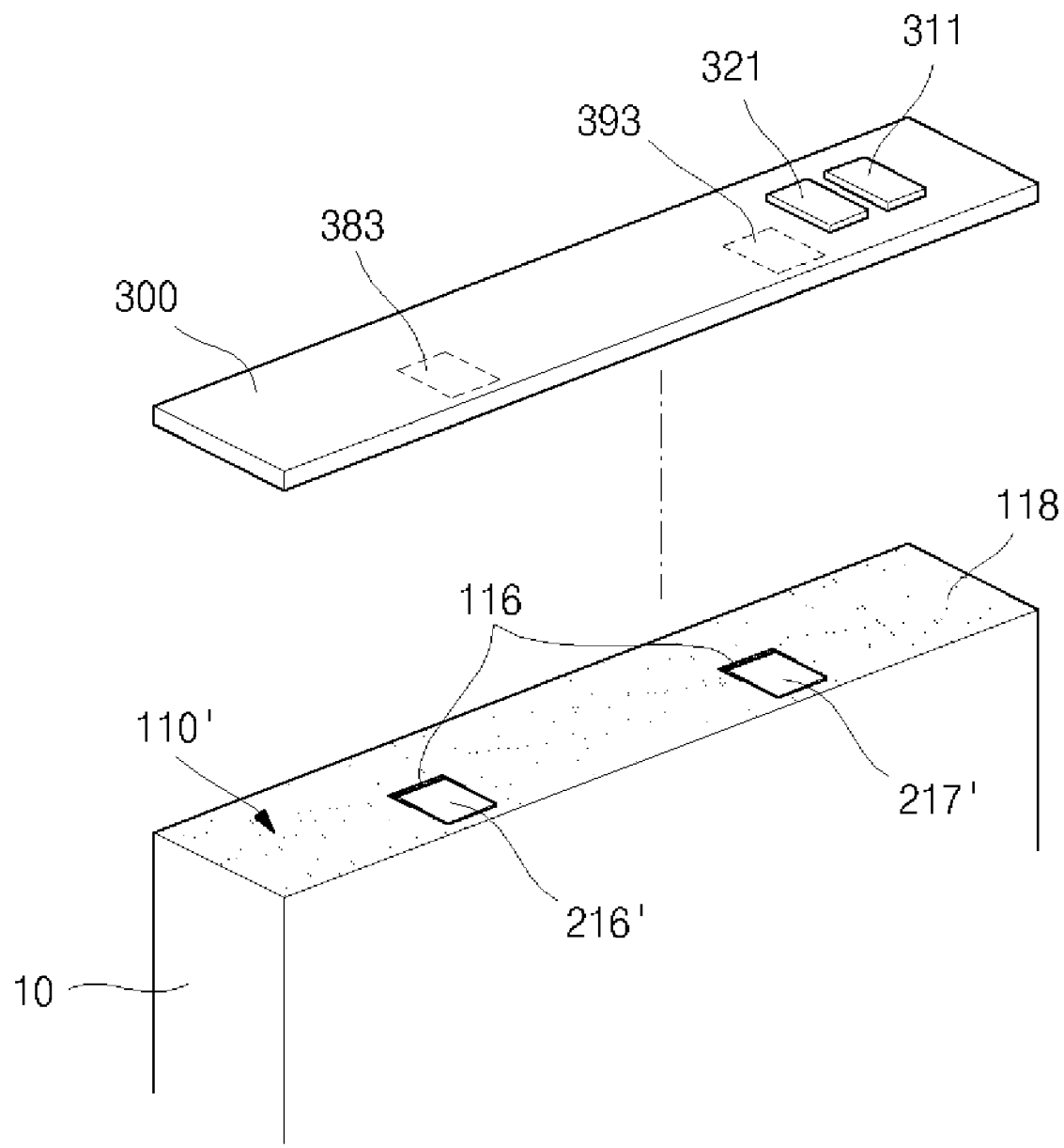
FIG. 5 is a perspective view showing a rechargeable battery according to an exemplary embodiment of the present invention.

FIG. 5 is a perspective view showing a rechargeable battery according to an exemplary embodiment of the present invention.

Referring to FIG. 5, a bare cell may have a cap plate 110' made of an insulation material. The cap plate 110' may have two grooves formed thereon, through which electrode tabs 216' and 217' may be drawn from the respective electrodes of an electrode assembly. The grooves may be sealed by an adhesive resin 116 with the electrode tabs 216' and 217' extending through them. The electrode tabs 216' and 217' may then be bent and fixed in a predetermined position on the cap plate 110'.

A protective circuit board 300, which has horizontal terminals 383 and 393 formed thereon may be fixed on top of the cap plate 110'. In the present exemplary embodiment, the protective circuit board 300 is thin and the electrode terminals 383 and 393 are exposed solely to the lower surface of the protective circuit board 300. It is difficult to perform laser welding by irradiating laser beams from above because the upper side of the electrical terminals are not exposed. Therefore, the electrical terminals 383 and 393 of the protective circuit board 300 may be connected to ends of the electrode tabs 216' and 217' by a conductive adhesive or conductive paste. Other parts of the protective circuit board 300 may be coupled to the cap plate 110' using an adhesive layer 118.

A compact breaker or a PTC device may be positioned inside the protective circuit board or bare cell.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A rechargeable battery, comprising:
   a bare cell comprising,
      an electrode assembly comprising two electrodes and a separator,
      a can to contain the electrode assembly and an electrolyte, and
      a cap assembly comprising a cap plate to seal an open portion of the can;
   a protective circuit board comprising an electrical terminal arranged horizontally and parallel to the cap plate on a surface of the protective circuit board; and
   a current interruption device arranged between the cap plate and the protective circuit board, the current interruption device comprising an upper electrode arranged horizontally, a body to sense heat and interrupt current, and a lower electrode arranged horizontally,
   wherein the lower electrode is connected to the cap plate,
   wherein the upper electrode and an electrode terminal of the cap assembly are electrically coupled with the electrical terminal of the protective circuit board,
   wherein both ends of the lower electrode extend beyond edges of other parts of the current interruption device and act as a terminal for welding, and
   wherein the upper electrode is thicker than the lower electrode.

2. The rechargeable battery of claim 1,
   wherein the current interruption device is a bimetal switch-type breaker or a positive temperature coefficient device.

3. The rechargeable battery of claim 1,
   wherein the electrical terminal of the protective circuit board is arranged between a center portion of the cap plate and a side of the cap plate.

4. The rechargeable battery of claim 3,
   wherein the electrical terminal of the protective circuit board is arranged above and overlaps the current interruption device.

5. The rechargeable battery of claim 1,
   wherein the upper electrode of the current interruption device comprises nickel or is coupled with a separate metal plate that comprises nickel.

6. The rechargeable battery of claim 1,
   wherein the lower electrode of the current interruption device comprises metal having good thermal conductivity.

7. The rechargeable battery of claim 6,
   wherein the metal having good thermal conductivity is aluminum.

8. The rechargeable battery of claim 5,
   wherein the upper electrode of the current interruption device is thicker than the lower electrode of the current interruption device.

9. The rechargeable battery of claim 1,
   wherein the upper electrode of the current interruption device extends beyond the edges of other parts of the current interruption device in the lateral direction.

10. The rechargeable battery of claim 1,
    wherein an upper end of an electrode terminal of the cap plate extends beyond the edges of other parts of the electrode terminal of the cap plate in the lateral direction.

11. The rechargeable battery of claim 1,
    wherein a hot-melt resin fills a space between the bare cell and the protective circuit board.

* * * * *